(12) United States Patent
Sarca et al.

(10) Patent No.: US 8,805,363 B2
(45) Date of Patent: Aug. 12, 2014

(54) SMART ANTENNA FOR INTERFERENCE REJECTION

(71) Applicant: Redline Communications Inc., Markham (CA)

(72) Inventors: Octavian Sarca, Aurora (CA); Serban Cretu, Toronto (CA); Aurel Picu, Aurora (CA)

(73) Assignee: Redline Communications Inc., Markham, Ontario (CA)

( * ) Notice: Subject to any disclaimer, the term of this patent is extended or adjusted under 35 U.S.C. 154(b) by 0 days.

(21) Appl. No.: 13/899,787

(22) Filed: May 22, 2013

(65) Prior Publication Data

US 2014/0099985 A1  Apr. 10, 2014

Related U.S. Application Data

(63) Continuation of application No. 13/682,540, filed on Nov. 20, 2012, now Pat. No. 8,548,466, which is a continuation-in-part of application No. 13/644,852, filed on Oct. 4, 2012, now Pat. No. 8,548,516.

(51) Int. Cl.
*H04W 4/00* (2009.01)

(52) U.S. Cl.
USPC ............................................ 455/434; 455/25

(58) Field of Classification Search
USPC ................... 455/525, 526, 160.1, 161.1, 434
See application file for complete search history.

(56) References Cited

U.S. PATENT DOCUMENTS

| | | | |
|---|---|---|---|
| 2002/0103013 A1* | 8/2002 | Watson et al. | 455/562 |
| 2004/0053634 A1 | 3/2004 | Gainey et al. | |
| 2006/0105791 A1* | 5/2006 | Ginzburg et al. | 455/515 |
| 2008/0220808 A1 | 9/2008 | Jalali | |
| 2009/0042596 A1 | 2/2009 | Yavuz et al. | |
| 2011/0075630 A1 | 3/2011 | Riess | |
| 2012/0052828 A1 | 3/2012 | Kamel et al. | |

* cited by examiner

*Primary Examiner* — Tu X Nguyen
(74) *Attorney, Agent, or Firm* — Nixon Peabody LLP

(57) ABSTRACT

A smart antenna system is provided for communicating wireless signals between a mobile device and a plurality of different fixed base stations using one or more channels and one or more beams. The smart antenna system includes a control subsystem, a radio transceiver and an antenna subsystem coupled to each other and adapted to perform scanning of one or more combinations of base stations, channels and beams using one or more test links established with one or more of the fixed base stations where the test links use at least some of the channels and the beams. A first combination of base station, channel and beam is selected based on the scanning; and a first operating link is established for transmitting a wireless signal to the selected base station using the selected channel and beam.

12 Claims, 14 Drawing Sheets

SMART ANTENNA FOR INTERFERENCE REJECTION

CROSS-REFERENCE TO RELATED APPLICATION

This application is a continuation of and claims priority to U.S. patent application Ser. No. 13/682,540, filed Nov. 20, 2012, which is a continuation-in-part of U.S. patent application Ser. No. 13/644,852, filed Oct. 4, 2012, each of which is incorporated by reference herein in its entirety.

FIELD OF THE INVENTION

This invention is directed towards antenna systems for mobile devices.

BACKGROUND OF THE INVENTION

Wireless communication is extensively used in mobile or nomadic applications.

In a typical mobile/nomadic application, a mobile or nomadic wireless device or mobile station will try to establish a link with a fixed base station, so as to transmit information to the base station. To achieve coverage of the desired area, multiple base-stations must be used. FIG. 1 shows an example of a system used to support a mobile application. Mobile station 111 will try to establish a link with one of base stations 121 and 122, as it travels along path 131.

Typical solutions for mobile or nomadic wireless devices use omnidirectional antennas that are isotropic or have similar properties, for example gain, in all directions of interest.

While mobile/nomadic devices use omnidirectional antennas, strict separation between base-stations covering adjacent areas is required to avoid harmful self-interference. Separation can be achieved through:

Time, that is, the base stations do not transmit and receive at the same time,

Frequency, that is, the base stations transmit and receive on different frequencies, or Code, that is, the base stations transmit and receive using different codes.

All these methods reduce the total system capacity.

FIG. 2 shows an example of the coverage 403 for base-station 401 and the coverage 404 for the base-station 402 when both base-stations use the same frequency channel, and the three mobile/nomadic devices 406, 407 and 408 use omni-directional antennas. This assumes there are no other time or code methods used to reduce interference between the two base-stations 401 and 402. As can be seen, much of the area of interest 405 is not adequately covered. Mobile device 406 receives coverage, that is, it can establish an operating link with better than threshold signal quality from base station 401 in area 403. Similarly mobile device 407 receives coverage from base station 402 in area 404. However, mobile device 408 cannot receive coverage from either base station 401 or 402 because the signal quality is not good enough. This is because the omnidirectional antenna captures signals from the two base-stations 401 and 402 and needs to be very close to one of them and very far from the other to obtain the needed signal quality.

In order to solve the problem shown in FIG. 2, there is a need for a system that has omnidirectional coverage, but is able to focus on one sector so as to optimize signal quality to enable communications with the highest reliability. Until now, systems have focused on optimizing signal strength, which may not result in enabling communications with the highest reliability.

SUMMARY OF THE INVENTION

In accordance with one embodiment, a smart antenna system for communicating wireless signals between a mobile device and a plurality of fixed base stations using one or more channels and one or more beams, said smart antenna system comprising a control subsystem, a radio transceiver and an antenna subsystem coupled to each other and adapted to perform scanning of one or more combinations of base stations, channels and beams using one or more test links established with one or more of the fixed base stations and the test links use at least some of the channels and the beams. A first combination of base station, channel and beam is selected based on data obtained during scanning, and a first operating link is established for transmitting a wireless signal to the currently selected base station using the currently selected channel and beam. After establishment of the first operating link, scanning is continued using one or more test links established with the currently selected base station, using one or more beams different from the currently selected beam and the currently selected channel, or with one or more combinations of base stations, channels and beams. The continued scanning is performed either periodically or aperiodically.

In one implementation, before the continued scanning is performed, said control subsystem inserts a downtime and the continued scanning is performed during the downtime.

In one implementation, the control subsystem calculates the duration of the downtime before inserting the downtime.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 3:
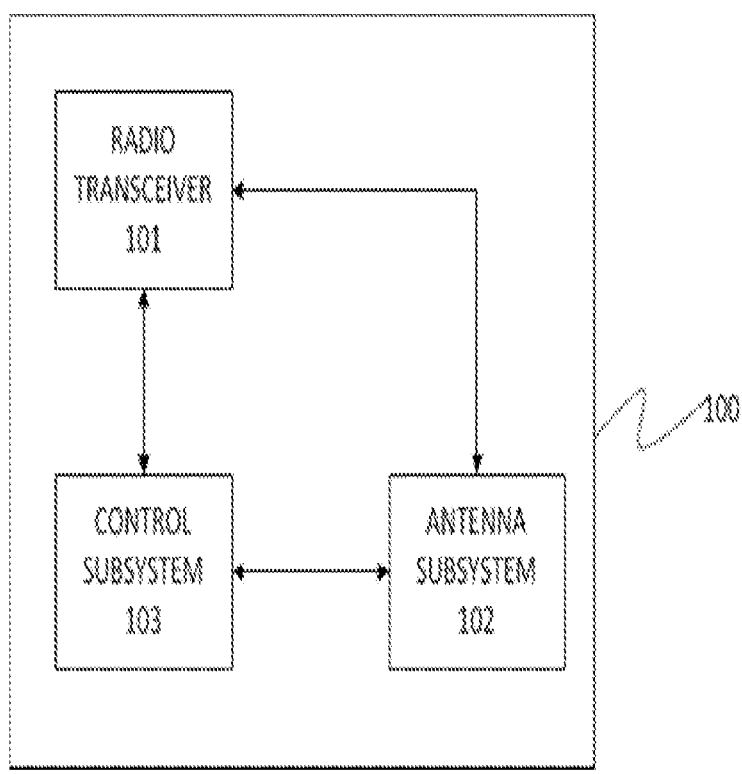
FIG. 3 shows a smart antenna system.

Turning now to the drawings and referring first to FIG. 3, FIG. 3 shows a smart antenna system 100 consisting of radio transceiver 101 to transmit over a wireless link; an antenna subsystem 102; and a control subsystem 103. Information can be passed between the radio transceiver 101, antenna subsystem 102 and control subsystem 103. For example, the control subsystem 103 can receive information, including, but not limited to wireless link quality information; and other information such as base station operating capacity and base station load/utilization; from either or both of the radio transceiver 101 and the antenna subsystem 102. The control subsystem 103 can process this information and command either or both of the radio transceiver 101 and antenna subsystem 102 accordingly. The smart antenna system 100 is designed to be installed in, for example, a mobile/nomadic device or station which establishes a wireless link to a base station.

The radio transceiver 101 performs several different functions, including but not limited to, for example, transmitting and receiving information on the available operating channels; obtaining data to compute signal quality measures such as signal to noise ratio (SNR), signal to interference and noise ratio (SINR) and bit error rate (BER); and computing these measures either by itself or together with the control subsystem 103. In one embodiment, the operating channel to be used for transmitting and receiving is set by the control subsystem 103. The radio transceiver can transmit on more than one channel. This allows the smart antenna system to have "background" operation. For example, while transmitting and receiving on a channel used in a current operating link in the foreground, the control subsystem 103 can direct the radio transceiver 101 to transmit and receive on other channels used in, for example, test links which have been set up in the background.

In another embodiment, in addition to the signal quality measures described above, link quality measurements can also be computed. These include, for example, packet error rate (PER), packet jitter and throughput.

The antenna subsystem 102 provides multiple beams that can be selected by the control subsystem 103. The multiple beams can be produced by independent antennas, by beam-steering or by beam-forming. These techniques are well known to one having skill in the art.

Figure 4:
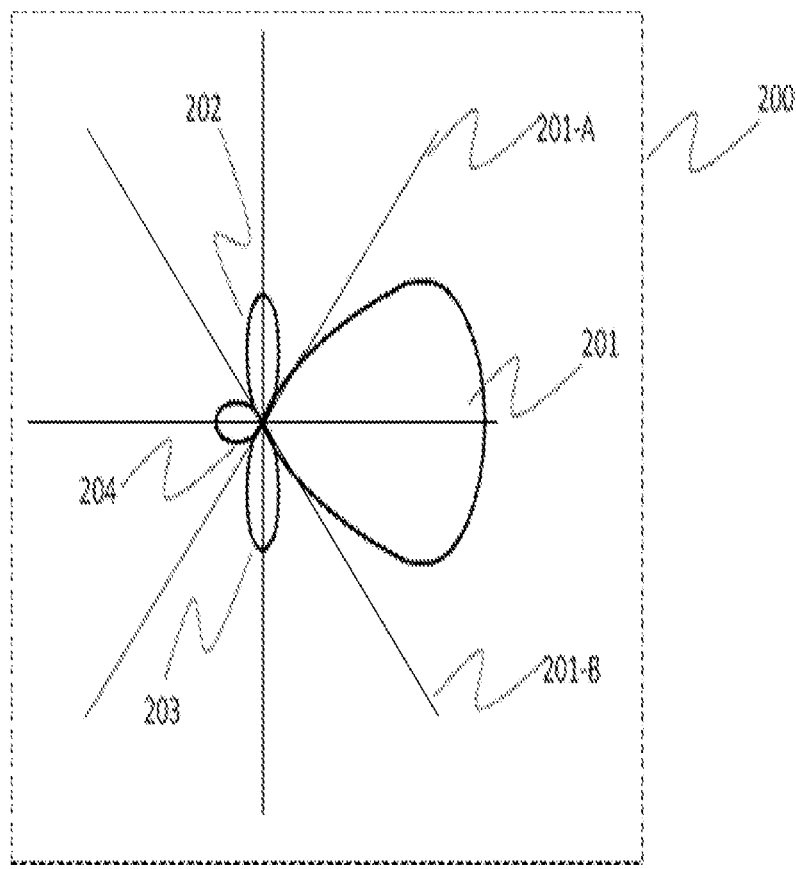
FIG. 4 shows a radiation pattern for beam 200.

Each beam provides nulls (directions in which signal is strongly attenuated) that can be used to eliminate interference. FIG. 4 shows an example radiation pattern of such a beam 200, where the main lobe 201 of the beam covers the 90° sector between lines 201-A and 201-B, while the lateral lobes 202 and 203 provide some attenuation and the back-lobe 204 provides very strong attenuation.

Figure 5:
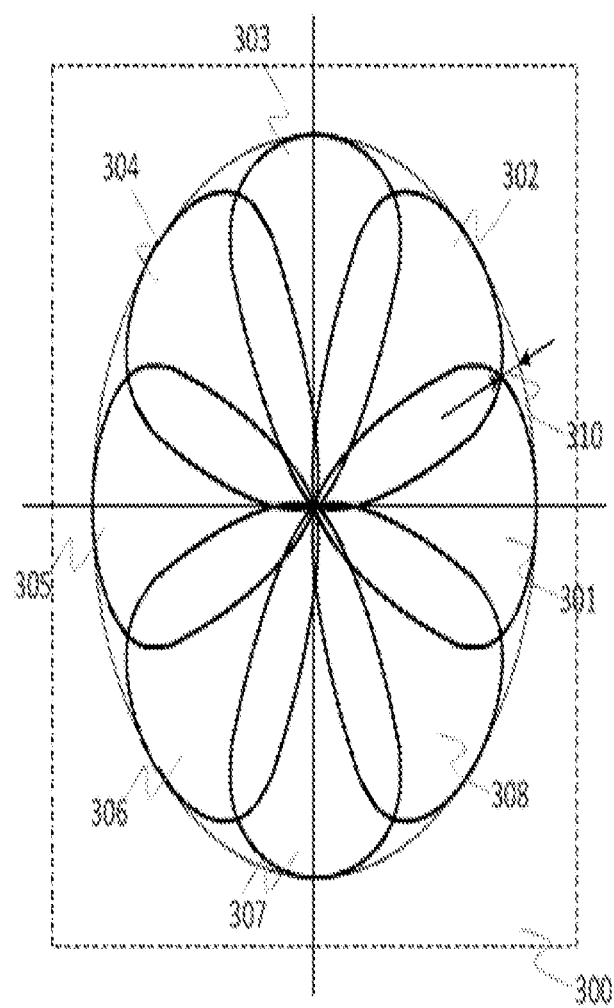
FIG. 5 shows an example radiation pattern for arrangement 300.

The sum of the coverage of all beams provides omnidirectional coverage. FIG. 5 shows an example radiation pattern for such an arrangement 300, where the beam 200 of FIG. 4, with only main lobe 201 shown for simplicity, is repeated 8 times as beams 301-308 at 45° intervals for 360° coverage. Beams 301-308 are overlapping to ensure low ripple in omnidirectional coverage. The ripple 310 is the difference between maximum gain and the minimum gain obtainable using all available beams.

The ability of the antenna subsystem 102 to provide multiple beams allows for "background" operation on other beams. This, together with the ability of the radio transceiver 101, to transmit and receive on other channels, means that the control subsystem 103 can establish test links in the background on different channels and beams, to the channel and beam used by the current operating link running in the foreground.

The control subsystem 103 is the controller of the smart antenna system 100. The control subsystem 103 commands, controls, co-ordinates and manages the operation of the antenna subsystem 102 and radio transceiver 101. As explained previously, the control subsystem 103 can receive information, such as wireless link status from either or both of the radio transceiver 101 and the antenna subsystem 102. When link status is active, the control subsystem 103 can collect information related to, for example, signal quality; and other information such as base station operating capacity and base station load/utilization; from the radio transceiver 101, or both the radio transceiver 101 and antenna subsystem 102.

The control subsystem 103 can process this collected information and send commands and control instructions to either or both of the radio transceiver 101 and antenna subsystem 102 accordingly.

As previously explained, the control subsystem 103 collects information related to signal quality. Various measures of signal quality can then be calculated. These measures include signal to noise ratio (SNR), signal to interference and noise ratio (SINR) and bit error rate (BER). As explained previously, in one embodiment the control subsystem 103 collects this information, and then together with the radio transceiver 101 calculates measures such as SNR, SINR and BER. In another embodiment, the radio transceiver 101 calculates these measures on its own. In a further embodiment, the control subsystem 103 together with the radio transceiver calculates a signal quality score for each base station based on a function which takes in one or more of signal quality measures such as SNR, SINR and BER as inputs, and produces the score as the output. For example, in one embodiment the control subsystem 103 calculates a weighted average based on SNR and SINR. In another embodiment, a weighted average is first calculated, then compared against a threshold, and used to calculate a performance score. The control subsystem 103 can store also store historical signal quality information, and other information for future use.

In another embodiment, in addition to the signal quality measures described above, as previously explained, link quality measurements can also be calculated. These measures include, for example, packet error rate (PER), packet jitter and throughput. Similar to signal quality, in one embodiment the control subsystem 103 collects this information, and then together with the radio transceiver 101 calculates measures such as PER, jitter and throughput. In another embodiment, the radio transceiver 101 calculates these measures on its own. In a further embodiment, the control subsystem 103 together with the radio transceiver calculates a link quality score for each base station based on a function which takes in one or more of link quality measures such as PER, jitter and throughput as inputs, and produces the score as the output. For example, in one embodiment the control subsystem 103 calculates a weighted average based on PER and jitter. In another embodiment, a weighted average is first calculated, then compared against a threshold, and used to calculate a performance score. The control subsystem 103 can store also store historical link quality information, and other information for future use.

In one embodiment, the control subsystem 103 is an independent module. In another embodiment, the control subsystem 103 is integrated with the other radio transceiver 101 control functions. The control subsystem 103 can be implemented in hardware, software, or some combination of hardware and software. In another embodiment, the control subsystem 103 is installed as software on, for example, the radio transceiver 101.

When the smart antenna system becomes active, for example, when it is:
powered up;
returned from sleep; or
turned active by the user;
the control subsystem 103 then performs scanning of combinations of base stations, channels and beams, that is, it establishes test links to base stations with different channels and beams using the radio transceiver 101 and the antenna subsystem 102, and performs analysis of results obtained from these test links to select the best combination of base station, channel and beam.

Figure 6:
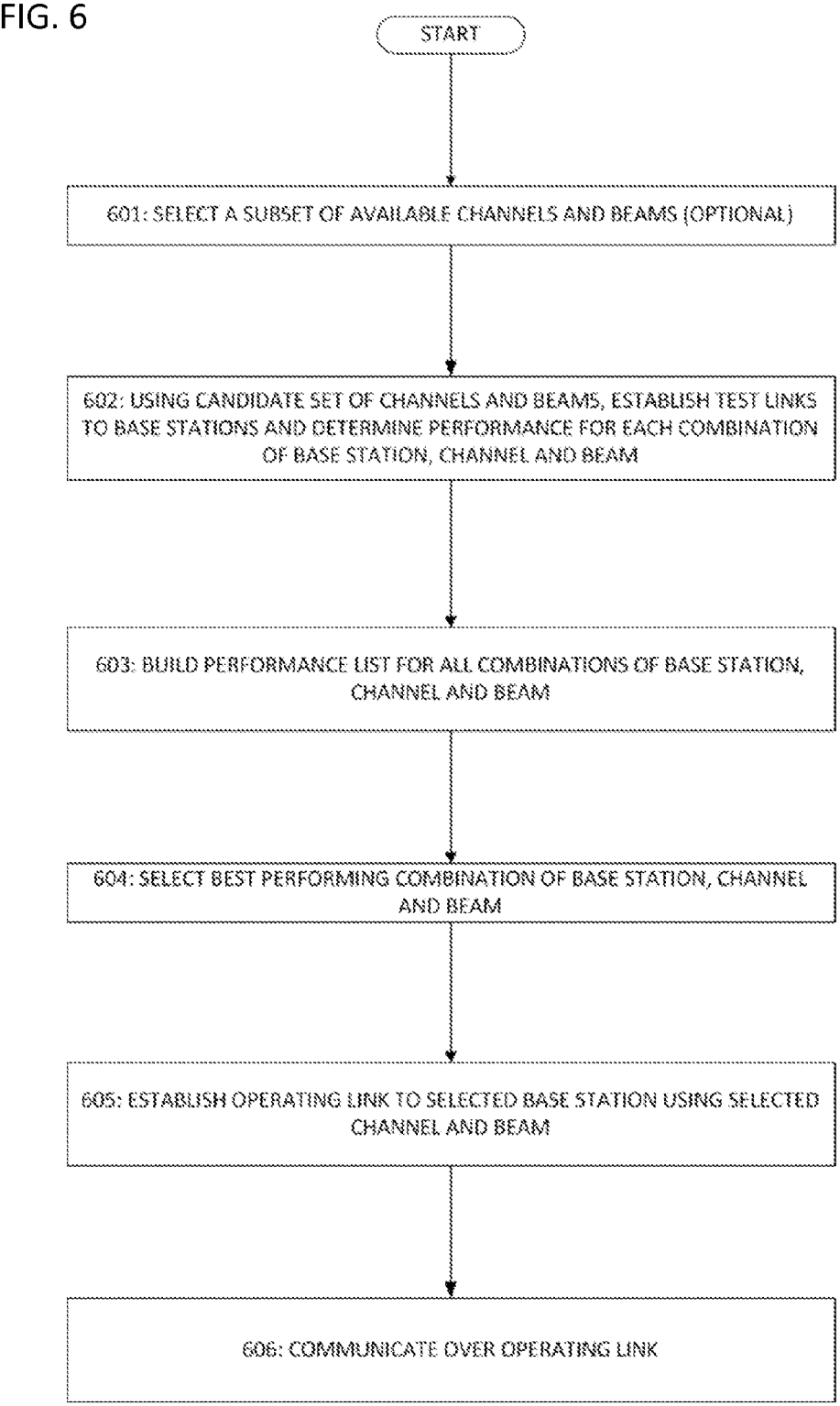
FIG. 6 shows a flowchart of the process when the smart antenna system 100 becomes active.

FIG. 6 shows a flowchart of the process when the smart antenna system 100 becomes active. In optional step 601, the control subsystem 103 selects a subset of the available beams and channels before the commencement of the scanning process, and then performs scanning using the selected subset. In one embodiment, control subsystem 103 selects the subset based on historical signal quality. As previously explained, signal quality can be measured by, for example, one of SNR, SINR and BER. As explained previously, in one embodiment the control subsystem 103 together with the radio transceiver 101 calculates measures such as SNR and SINR. In another embodiment, the radio transceiver 101 calculates these measures on its own. In a further embodiment, the control subsystem 103 together with the radio transceiver 101 calculates a signal quality score for each base station based on a function which takes in one or more of signal quality measures such as SNR and SINR as inputs, and produces the score as the output. For example, in one embodiment the control subsystem 103 calculates a weighted average based on SNR and SINR. In another embodiment, a weighted average is first calculated, then compared against a threshold, and used to calculate a performance score.

In another embodiment, in addition to the signal quality measures described above, as previously explained, link quality measurements can also be calculated. These measures include, for example, packet error rate (PER), packet jitter and throughput. Similar to signal quality, in one embodiment the control subsystem 103 collects this information, and then together with the radio transceiver 101 calculates measures such as PER, jitter and throughput. In another embodiment, the radio transceiver 101 calculates these measures on its own. In a further embodiment, the control subsystem 103 together with the radio transceiver calculates a link quality score for each base station based on a function which takes in one or more of link quality measures such as PER, jitter and throughput as inputs, and produces the score as the output. For example, in one embodiment the control subsystem 103 calculates a weighted average based on PER and jitter. In another embodiment, a weighted average is first calculated, then compared against a threshold, and used to calculate a performance score.

In another embodiment, in optional step 601, the control subsystem 103 uses geo-location information, for example, the location of the mobile/nomadic device relative to the base-stations, to select the subset of the available channels and beams. In yet another embodiment, positional/motion information obtained, for example, from sensors in the mobile/nomadic device are used by the control subsystem 103 in optional step 601 to select the subset of the available channels and beams. Examples of positional/motion information include velocity of the device, acceleration of the device, direction of travel of the device, orientation of the device, angular velocity of the device, angular acceleration of the device and altitude of device. In yet another embodiment, the subset of the available channels and beams is selected by control subsystem 103 based on user input and instructions.

In yet another embodiment, the subset of the available channels and beams is selected in optional step 601 based on at least one of historical signal quality, geo-location information, user input/instructions and positional/motion information.

In yet another embodiment, in optional step 601 the control subsystem 103 uses the fact that the beams are overlapping to select a subset of beams to perform scanning.

Steps 602-604 detail the scanning process. In step 602, the control subsystem 103 determines the best-performing combination of base station, channel and beam. It does so by attempting to establish wireless test links to base stations, using a set of candidate channels and beams comprising at least some of the one or more available channels, and some of the one or more available beams. In one embodiment, the candidate set is all available channels and beams. In another embodiment, the candidate set is the subset of channels and beams selected using one of the methods outlined above.

For each wireless test link that the control subsystem 103 successfully establishes with a base station, the control subsystem 103 collects information relating to signal quality of the test link. As previously explained, signal quality can be measured by SNR, SINR or BER. In another embodiment, the control subsystem 103 uses the test link to collect information including, but not limited to, link quality, base station operating capacity; and base station load/utilization.

The control subsystem 103 then measures the performance for the combination of base station, channel and beam. In one embodiment, performance is measured by signal quality. As previously explained, signal quality can be measured by SNR, SINR or BER. In one embodiment the control subsystem 103 together with the radio transceiver 101 calculates SNR, SINR and BER. In another embodiment, the radio transceiver 101 calculates these measures on its own. In an alternative embodiment, the control subsystem 103 together with the radio transceiver 101 further calculates a signal quality score based on a function which takes in one or more of signal quality measures such as SNR and SINR as inputs, and produces the score as the output. One example of such a function is a weighted average. Another example of such a function is where a weighted average is first calculated, then compared against a threshold, and used to calculate a performance score.

In another embodiment, performance can be measured by calculating a score for each combination based on a function which takes in one or more of signal quality measures such as SNR and SINR; link quality measures such as PER, jitter and throughput, base station operating capacity; and base station load/utilization as inputs, and produces the score as an output. For example, in one embodiment, the control subsystem 103 calculates a weighted average based on SINR, base station operating capacity; and base station load/utilization; and selects the base station with the best weighted average. In another embodiment, the control subsystem 103 first calculates the weighted average, then compares against a threshold, and uses the comparison to calculate a final performance score.

Figure 6A:
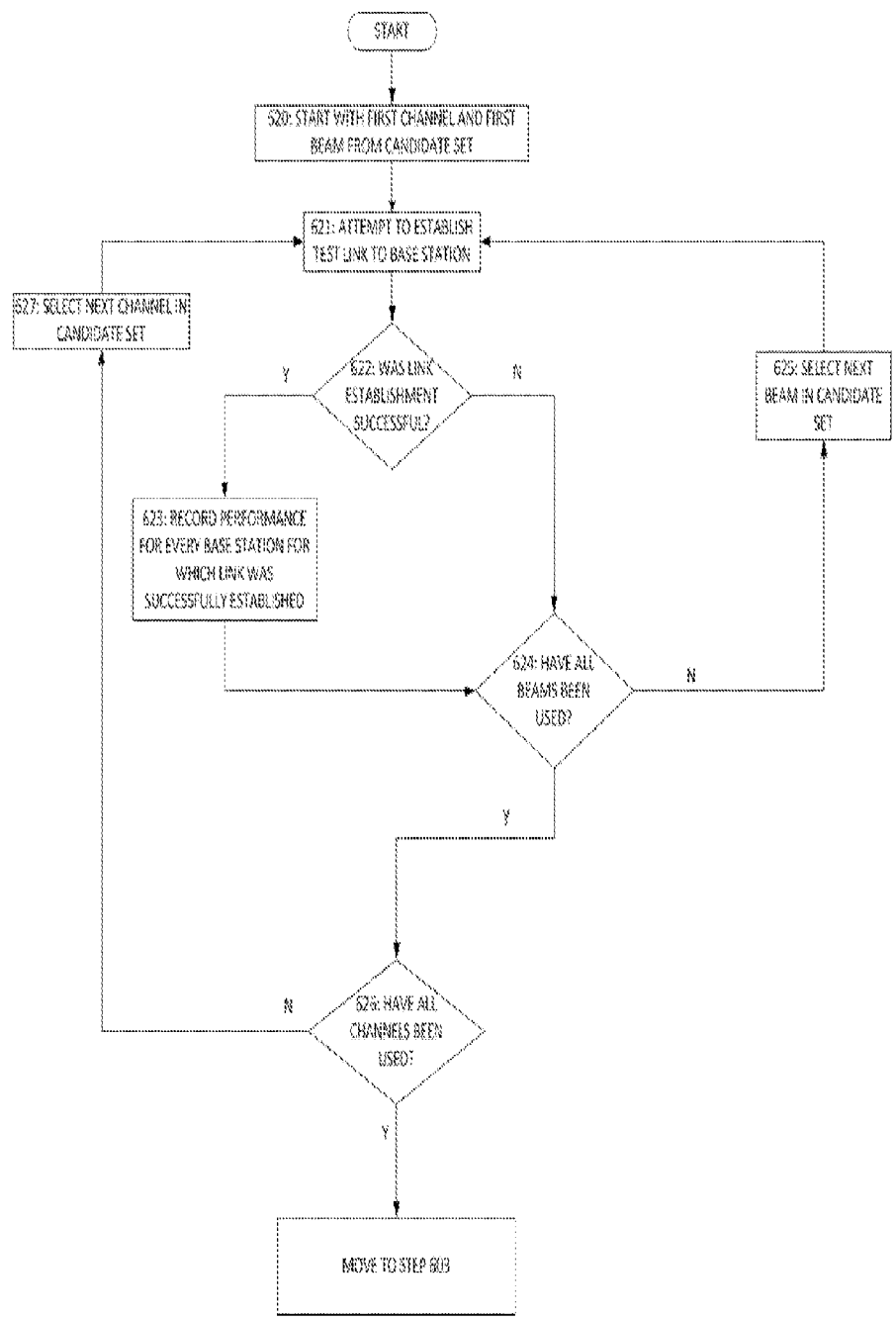
FIG. 6A shows one embodiment for determining the operating channel and the best-performing beam from a candidate set of channels and beams.

FIG. 6A shows one embodiment to perform step 602 for a candidate set of channels and beams. In FIG. 6A, control subsystem 103 scans all channels in the candidate set, and for each channel, all available beams in the candidate set. In step 620, control subsystem 103 selects a first channel and a first beam from the candidate set. In step 621, control subsystem 103 attempts to establish a test link to a base station using the first channel and the first beam in the candidate set. If this is successful, (step 622) then in step 623 the control subsystem 103 records performance for every base station, channel and beam for which a test link is successfully established.

In step 624, the control subsystem 103 checks to see if all beams have been used. If not, then, in step 625, the control subsystem 103 selects the next beam in the candidate set and returns to step 621. If all beams have been used, then in step 626 the control subsystem 103 checks to see if all channels have been used. If not, then in step 627, the control subsystem selects the next channel in the candidate set and returns to step 621. If all channels have been used, the control subsystem 103 then moves to step 603.

In another embodiment in step 602, the control subsystem 103 scans beams in the candidate set, and for each beam, it scans all channels in the candidate set.

Once this is complete, then in step 603 the control subsystem 103 builds a list showing performance for all combinations of base station, channel and beam.

In step 604 the control subsystem 103 selects the best performing combination of base-station, channel and beam based on the information it collected in steps 602 and 603.

At the end of the scanning process, in step 605, the control subsystem 103 then establishes an operating link to the selected base-station using the selected operating channel and beam. Communication over the operating link is carried out in step 606. In a further embodiment, if the operating link is not successfully established in step 605, then the control subsystem 103 establishes an operating link to the next best combination of base station, operating channel and beam, and communication over the operating link is carried out in step 606.

Figure 6B:
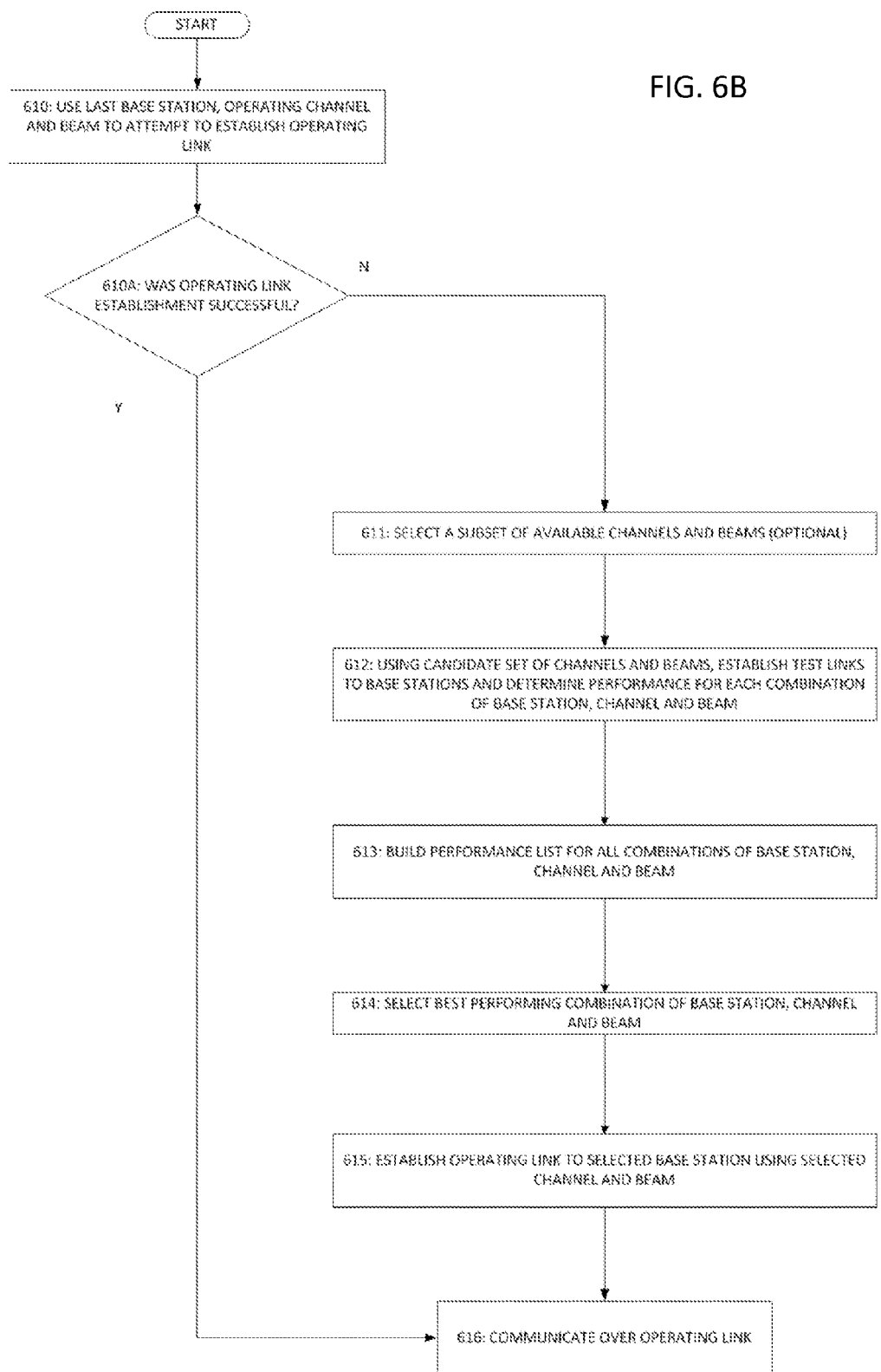
FIG. 6B is the flowchart of the process for another embodiment when the smart antenna system 100 becomes active.

In one embodiment, as shown in FIG. 6B, in step 610, when the smart antenna system 100 becomes active, the control subsystem 103 configures the radio transceiver 101 first, and then the antenna subsystem 102 to connect with the base station and establish an operating link on the channel and with the beam on which an operating link was last established. If operating link establishment fails (step 610A), then control subsystem 103 performs steps 612-616, which are similar to steps 602-606 described above. In one embodiment, similar to as described previously for step 601, control subsystem 103 may optionally perform step 611, which is selecting a subset of the available channels and beams for the candidate set in step 612.

In one embodiment, after the operating link is established the base station, channel and beam selection remain fixed until the operating link is lost. Once the operating link is lost, the control subsystem 103 performs steps 602-606 of FIG. 6.

In one embodiment, similar to as described previously, control subsystem 103 additionally performs step 601.

In another embodiment, after the operating link is established, the control subsystem 103 performs tracking, that is, the control subsystem 103 continues to search for a better combination of base station, channel and beam than the currently selected combination of base station, operating channel and beam. In one embodiment, the control subsystem 103 performs tracking in the background; while communication over the currently established operating link is ongoing.

Figure 6C:
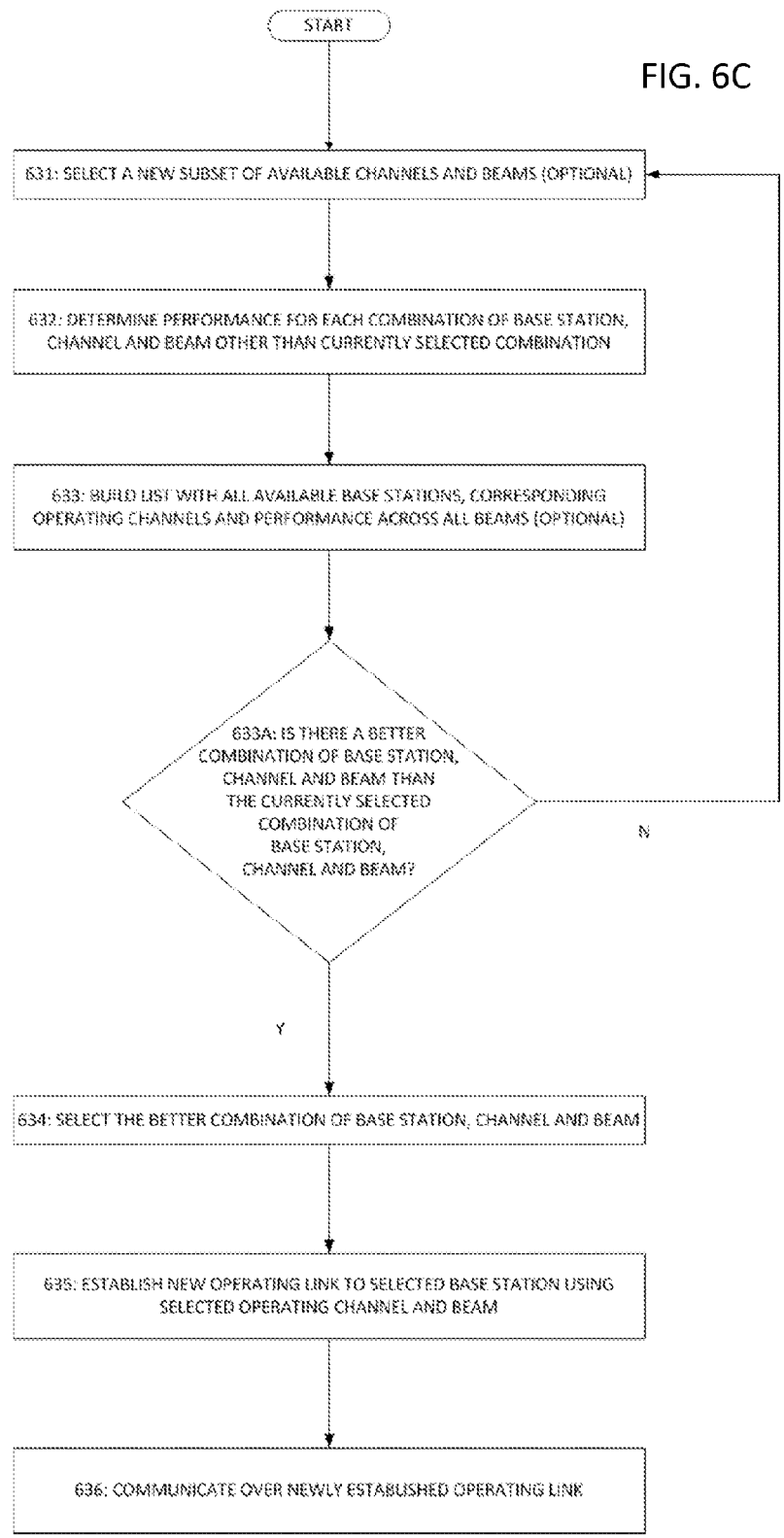
FIG. 6C shows a sequence of steps for the tracking process.

FIG. 6C shows a sequence of steps involved in tracking.

Figure 6D:
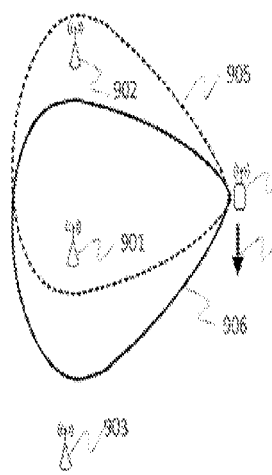
FIG. 6D shows a situation where mobile device 904 uses beam 906 to connect to base station 901 to maximize signal to interference and noise ratio (SINR)
Figure 6E:
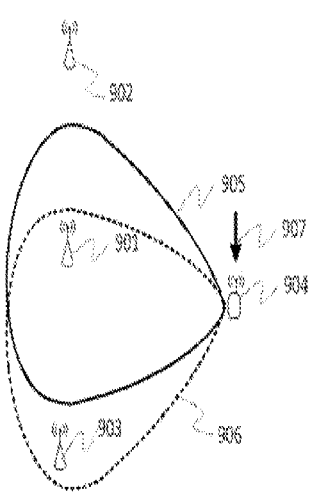
FIG. 6E shows a situation where after travelling in direction 907, mobile device 904 changes to beam 905 to connect to base station 901 to maximize signal to interference and noise ratio (SINR)
Figure 6F:
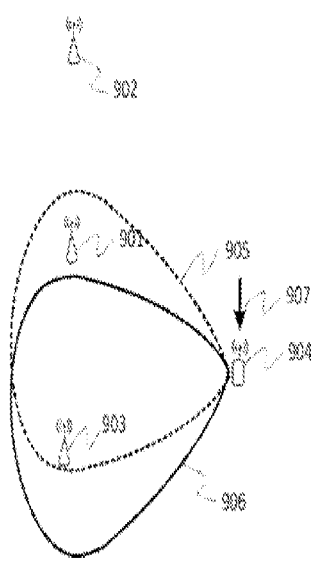
FIG. 6F shows a situation where after further travel in direction 907, mobile device 904 changes to beam 906 to maximize signal to interference and noise ratio (SINR)

An example situation where tracking is useful is shown in FIGS. 6D-6F. As a mobile device changes its position relative to the base-station to which is connected, it is possible that the currently selected beam might no longer be the optimum one. FIGS. 6D and 6E show an example of such a situation. In FIG. 6D, the mobile device 904 uses beam 906 to connect to base-station 901 because doing so would avoid interference from base-stations 902 and 903 and therefore offers the best SINR.

However, as the mobile device moves in direction 907 the beam 906 will, at a certain point, offer worse SINR than beam 905 because of interference from base-station 903. FIG. 6E shows the same mobile device 904 after it moved in direction 907 enough that the optimal beam is now beam 905 instead of beam 906. FIG. 6F shows the same mobile device 904 after further moving in direction 907 enough that the optimum base-station is no longer base-station 901 on beam 905 but base-station 903 on beam 906. In such a situation, tracking would be useful to select a beam with better performance.

In a further embodiment, the control subsystem 103 optionally performs step 631 of FIG. 6C, that is, it selects a new subset of channels and beams to be used in the tracking process using at least one of signal quality, geo-location and positional/motion information as outlined above.

In another embodiment, in step 631, positional/motion information, examples of which have been previously detailed, can be used together with geo-location information of the device to predict the path of the device, and orientation of the device along this predicted path. Based on this predicted path/orientation and other information such as geo-location information of the base stations; subsets of the base stations, beams and channels which are likely to provide better links in the future can be pre-loaded for tracking. For example, with reference to FIGS. 6D-6F, if the positions of base stations 901, 902 and 903 are known, then based on the orientation of device 904, the direction of motion 907 of device 904, and the beam patterns, it is possible to determine the regions of coverage, and the interference which is likely to be experienced if the device continues on the same path. A prediction is then made that either one of beam 905 and beam 906 will be used. The candidate subset of beams and channels can be narrowed to either beam depending on which one is being used. For example, if beam 905 is being used, then the candidate subset of beams and channels is narrowed to beam 906. If the velocity and acceleration of device 904 is also known, then the instant at which the beam switch should occur can also be predicted. In another embodiment, predicted path and orientation are calculated by a subsystem external to the smart antenna, and this information is communicated to the smart antenna to be pre-loaded for the tracking process.

In step 632, the control subsystem 103 determines performance for all combinations of base station, channel and beam other than the currently selected combination. In one embodiment, similar to step 602, it does so by using a candidate set of channels and beams to establish test links to base stations. In one embodiment, the candidate set is the subset of beams and channels previously selected in step 601 of FIG. 6. In another embodiment, the candidate set is the subset of beams and channels selected in optional step 631. In yet another embodiment, the candidate set is the set of all available channels and beams.

In one embodiment, in step 632 the control subsystem 103 performs steps 620-627 of FIG. 6A for all combinations of base station, channel and beam other than the currently selected combination.

Figure 6G:
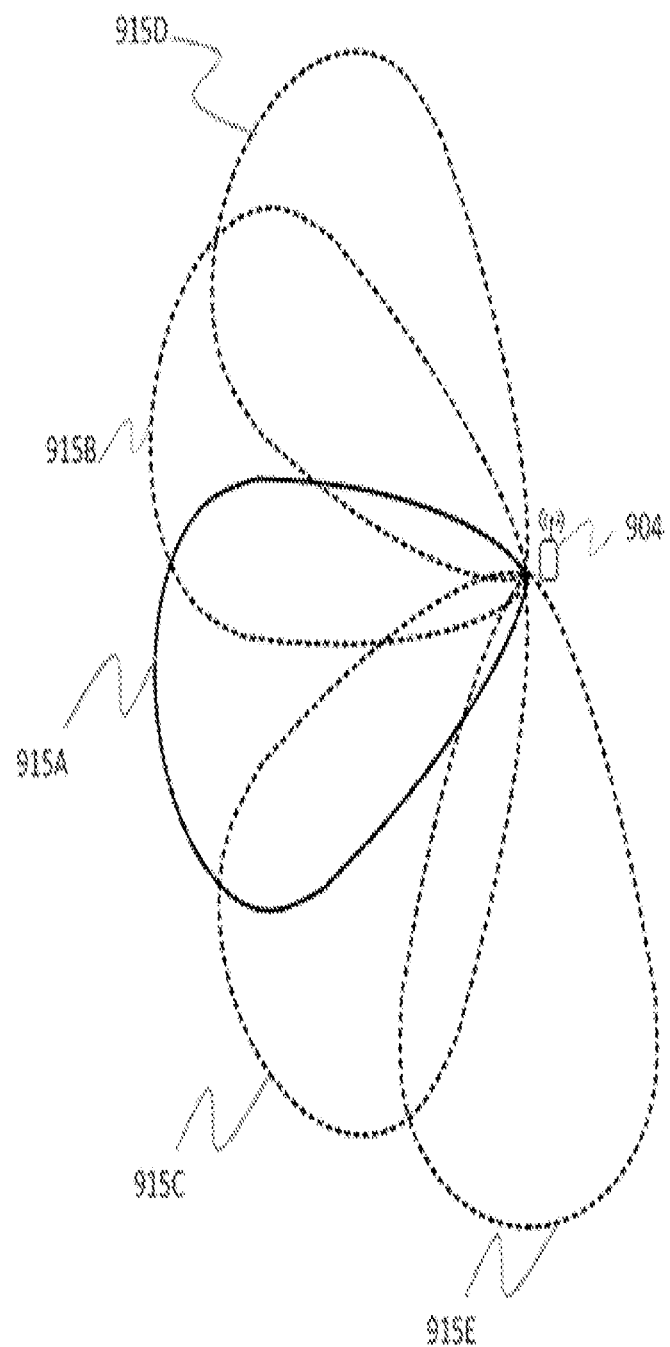
FIG. 6G shows beams 915A-915E produced by mobile device 904

In another embodiment, in step 632, control subsystem 103 searches for a better beam by testing the performance of other beams while the operating link is running on the currently selected beam. In one embodiment, the control subsystem 103 only tests the performance of difference beams, and keeps the base station and operating channel the same. In one embodiment, control subsystem 103 performs searching by periodically instructing the antenna subsystem 102 to switch between the currently selected beam and its neighbors to detect if any of the neighboring beams offer a better signal quality. In one embodiment, the control subsystem 103 alternates between adjacent beams. For example, in FIG. 6G, beam 915A shown by the solid line is the currently used beam. Beams 915B and 915C are adjacent to 915A. Beam 915D is adjacent to beam 915B, and 915E are adjacent to beam 915C. Then, testing will alternate between beam 915B and beam 915C. This switching can be carried out, for example, during a period between data transmissions such as for example, a gap between packets or bursts of packets. In another embodiment, these gaps or periods are inserted between data transmissions to specifically allow such switching to occur.

Figure 6H:
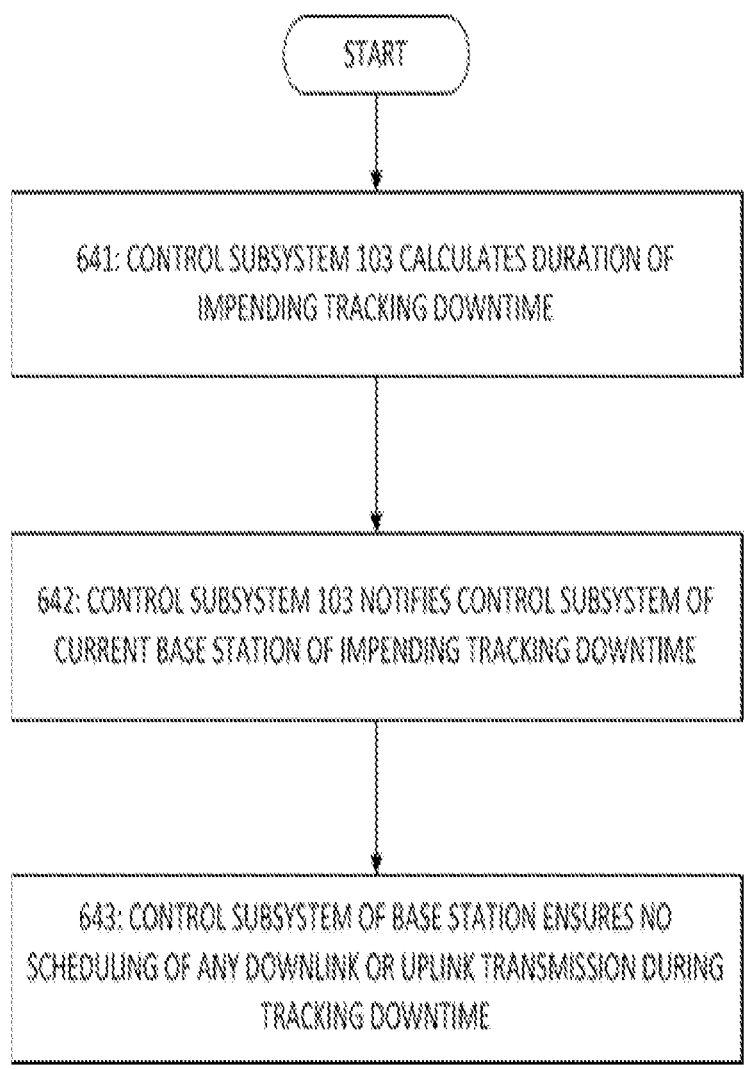
FIG. 6H shows a sequence where tracking downtimes are inserted between data transmissions to allow switching between beam-channel combinations to occur.

FIG. 6H shows a sequence where these gaps or periods, or more specifically, tracking downtimes are inserted between data transmissions to specifically allow such switching to occur. In one embodiment, the tracking downtime is fixed. In another embodiment, in step 641, control subsystem 103 calculates the duration of the impending tracking downtime. In one embodiment, the duration of the period of tracking downtime is set such that it is short enough not to affect the latency of the user traffic. In one embodiment, the utilization of the down-link and the up-link is first determined. Once this utilization is calculated, then using known formulas, the average latencies for different tracking downtime periods can be estimated. In one embodiment, in order to obtain the estimates, the average latency can be approximated by the sum of the average time from which a given packet arrives in the buffer until the end of the downtime; and the average time taken to clear all the packets which are ahead of the given packet. Both these average times can be calculated using formulas known to one of skill in the art. Then, the estimated average latency for each tracking downtime duration can be compared to a threshold latency. The tracking downtime duration can be chosen such that the estimated average latency is less than the threshold.

In step 642, control subsystem 103 notifies, for example, the control subsystem of the current base-station of the impending tracking downtime.

In step 643, upon receiving the notification the control subsystem of the base-station ensures that it will not schedule any down-link (base-station to device) or up-link (device to base-station) transmission to or from the notifying mobile device during the tracking downtime. During the same period of time, the base-station buffers all data packets that need to be delivered to the mobile device and any other previously scheduled downlink or uplink scheduled allocations that have been agreed with the mobile device. Also, the mobile device buffers all data packets that need to be delivered to the base-station and any other previously scheduled downlink or uplink scheduled allocations that have been agreed with the base-station.

In one embodiment, if the duration of the tracking downtime period is less than the minimum duration required to obtain a good measurement of signal quality for a single combination of base station, beam and channel; then data is acquired over several periods until a sufficient amount of data has been acquired to obtain a good measurement of signal quality for a single combination.

In another embodiment, if the duration of the tracking downtime period is greater than the minimum duration required to test a single combination of base station, beam and channel; then the control subsystem 103 will test two or more combinations of base station, beam and channel. The number of combinations tested is given by:

$$N_C = \left\lceil \frac{\text{Tracking downtime}}{\text{Minimum duration required per combination}} \right\rceil$$

where $N_C$ is the number of combinations tested in a given tracking downtime. For example, if it is determined that the minimum duration needed to obtain good measurement of signal quality for a single combination is 1 ms and the tracking downtime duration is 1.2 ms, then 2 channels are tested. If it is determined that the tracking downtime period is less than the minimum duration needed to obtain good measurements of signal quality for all the combinations within the candidate set of beams and channels, then data is acquired over several periods until a sufficient amount of data has been acquired to obtain good measurements of signal quality for all the combinations. Using the example above, if it is determined that the minimum duration needed to obtain good measurement of signal quality for a single combination is 1 ms and there are 2 combinations within the candidate set of beams and channels, then the minimum duration needed to obtain good measurement for both combinations is 2 ms. However, if the tracking downtime duration is 1.2 ms, then data must be acquired over 2 durations to ensure that a good measurement of signal quality can be obtained.

In another embodiment, if the duration of the tracking downtime period is greater than the minimum duration required to test a single combination of base station, beam and channel; then the number of combinations tested is given by:

$$N_C = \left\lfloor \frac{\text{Tracking downtime}}{\text{Minimum duration required per combination}} \right\rfloor$$

where $N_C$ is the number of combinations tested in a given tracking downtime. For example, if it is determined that the minimum duration needed to obtain good measurement of signal quality for a single combination is 1 ms and the tracking downtime duration is 1.2 ms, then only one channel can be tested to ensure that a good measurement of signal quality can be obtained. Similar to as previously explained, if it is determined that the tracking downtime period is less than the minimum duration needed to obtain good measurements of signal quality for all the combinations within the candidate set of beams and channels, then data is acquired until a sufficient amount of data is recorded, to obtain good measurements of signal quality for all the combinations.

In one embodiment, the control subsystem 103 tests the signal quality on the neighboring beam using normal data packets on the neighboring beam. In another embodiment, the control subsystem 103 instructs the antenna subsystem 102 to switch from the currently selected beam to a neighboring beam during a period between data transmissions, and then tests the signal quality on the neighboring beam, using special channel sounding packets on the neighboring beam. Control subsystem 103 then instructs the antenna subsystem 102 to switch back to the currently selected beam and resumes transmission of normal data packets. This is done to ensure that the delivery of data packets is not affected in case the signal quality on the neighboring beam is very poor.

In certain cases, the interference experienced may be periodic. Furthermore, some base stations operate periodically, alternating between short "busy" periods and long "quiet" periods. If tracking is performed periodically, there is a chance that tracking will only occur during the "quiet" periods, and the base station will be "missed".

To overcome these problems, in another embodiment, the mobile device performs tracking at aperiodic intervals to remove the impact of this periodic interference on the SINR measurements. In one embodiment, the aperiodic intervals are pseudo-random.

In one embodiment, in optional step 633, the control subsystem 103 builds a list showing performance for all combinations of base stations, channels and beams in step 633. As previously explained, performance may be measured by signal quality or other measures, or a combination of signal quality and other measures. As has also been previously explained, signal quality can be measured by, for example, SNR, SINR, BER, or a score calculated from a function which takes in measures such as SNR and SINR as inputs, and produces the score as an output.

If, for example, using the list built in step 633, or otherwise, the control subsystem 103 finds a better combination of base station, channel and beam than the currently selected combination of base station, channel and beam (step 633A), then it moves to select the better combination in step 634. For example, in the embodiment described above with reference to FIG. 6G, if beam 915B offers better performance than 915A, then control subsystem 103 selects beam 915B. If not, then beam 915C is tested. If 915C is found to be better, then control subsystem 103 selects beam 915C. In another embodiment, the control subsystem 103 selects the better combination in step 634, only if the control subsystem 103 determines that the improvement in signal quality persists for a predefined period.

If not, then control subsystem 103 continues searching for a better combination of base station, operating channel and beam. In one embodiment, this involves selecting a new subset of available channels and beams (step 631).

After the control subsystem 103 has selected the better combination in step 634, in step 635 the control subsystem 103 establishes a new operating link to the selected base station using the new channel and beam.

In step 636, communication over the newly established operating link begins. Optionally, the candidate set of beams and channels will also be updated. For example, with reference to FIG. 6G, if control subsystem 103 communicates using beam 915B, then in the next tracking downtime, beams 915D and 915A will be tested. If control subsystem 103 communicates using beam 915C, in the next tracking downtime, beams 915E and 915A will be tested.

In another embodiment, the control subsystem 103 searches for a standby combination of base station, channel and beam, in case the current operating link fails. In one embodiment, the control subsystem 103 periodically performs steps 631-633 of FIG. 6C in the background. If the current operating link fails, then the control subsystem 103 selects the best combination of base station, channel and beam identified; establishes a new operating link over this combination; and communicates over this newly established operating link.

Figure 7:
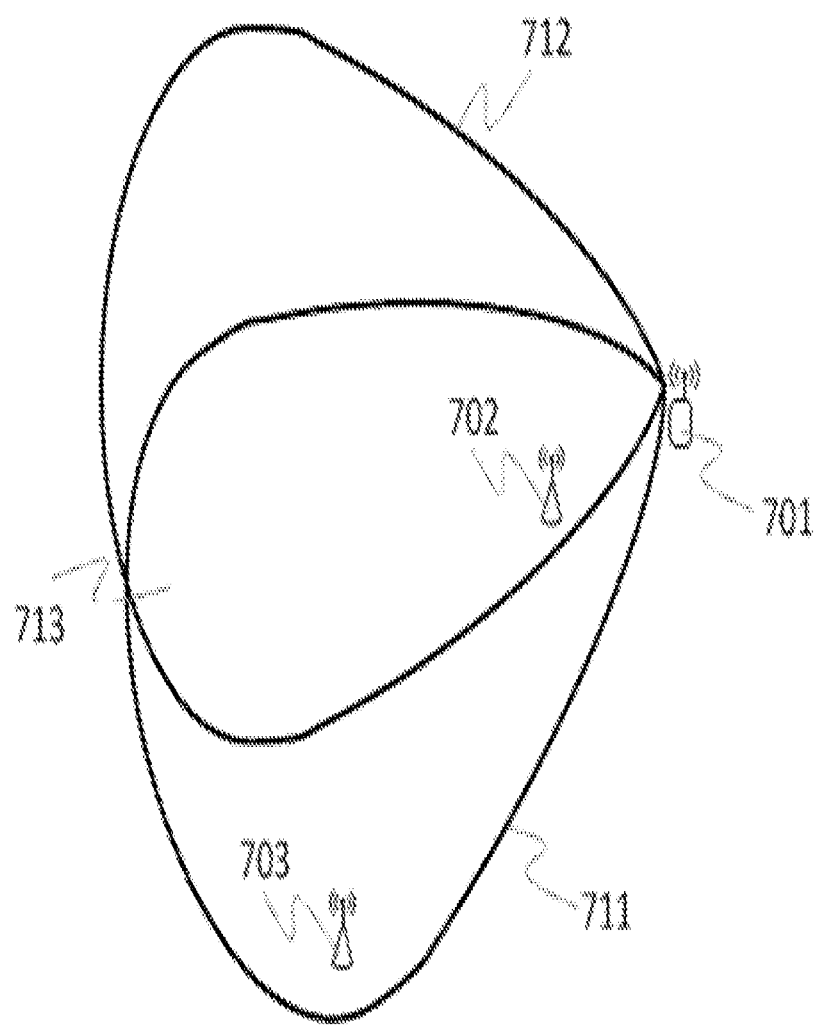
FIG. 7 shows an illustrative example of the advantage of making selections of base station, operating channel and beam based on signal quality over signal strength.

The process outlined above to select base station, operating channel and beam based on signal quality offers advantages over making decisions based on signal strength. An illustrative example of these advantages is shown in FIG. 7. FIG. 7 which shows a mobile device 701 containing a smart antenna system, with wireless test links to base stations 702 and 703. Device 701 determines that base station 702 provides better signal quality than base station 703. Device 701 then has to select a beam. It decides to select beam 712 over beam 711, for the following reason: Device 701 can establish a test link to base station 702 with either beam 711 or 712 because it is in the area 713 in which the two beams overlap. The signal strength for base station 702 using beam 711 is stronger than beam 712 because base station 702 is closer to the center of beam 711. However, if the control subsystem 103 selected beam 711, then it would have to contend with interference from base station 703, and therefore the SINR would be lower. Control subsystem 103 chooses beam 712 because it offers lower interference, and consequently a better signal quality, than with beam 711.

Figure 1:
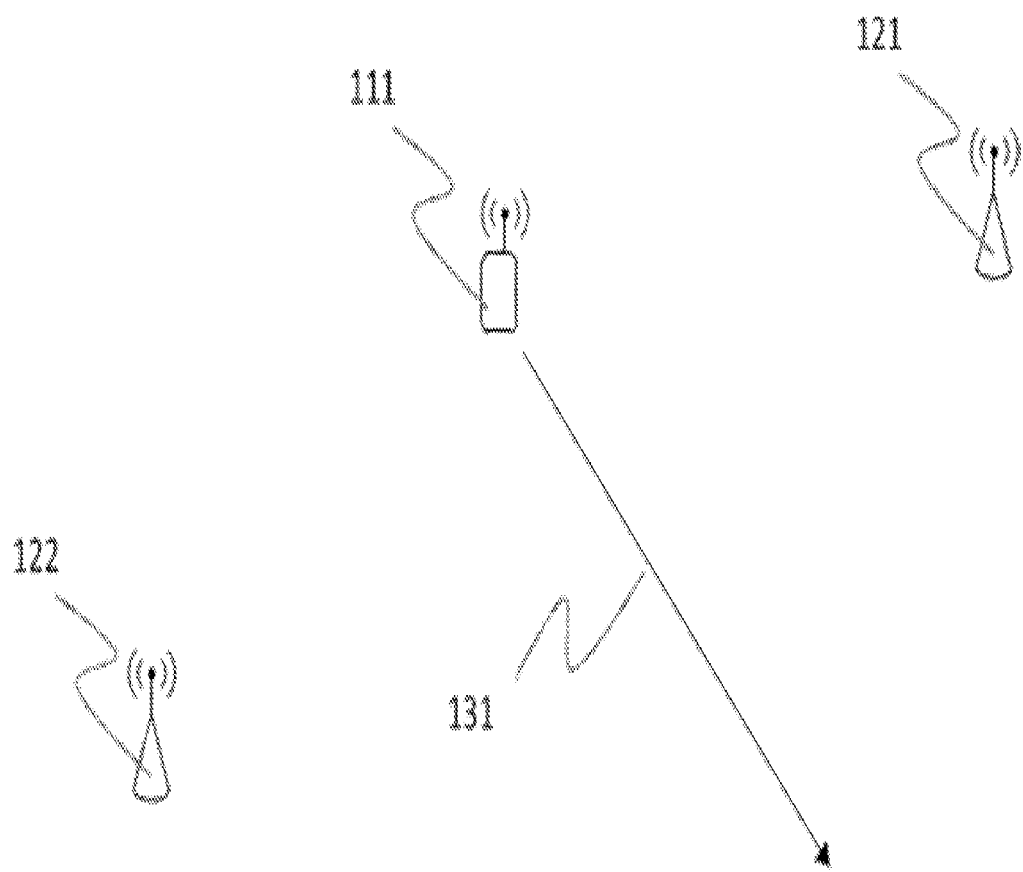
FIG. 1 shows an example of a system used to support a mobile application.
Figure 2:
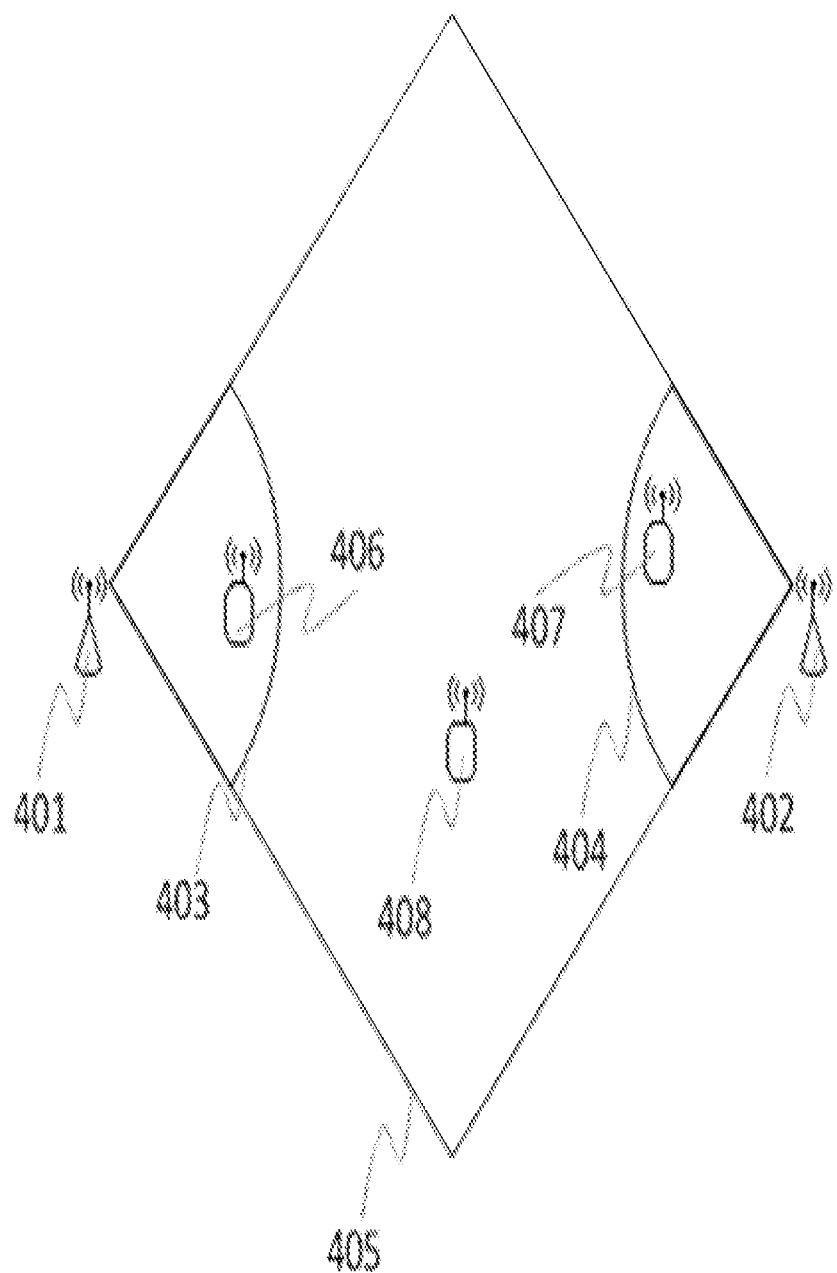
FIG. 2 shows example coverage of a given area for a mobile/nomadic device or station with an omnidirectional antenna.
Figure 8:
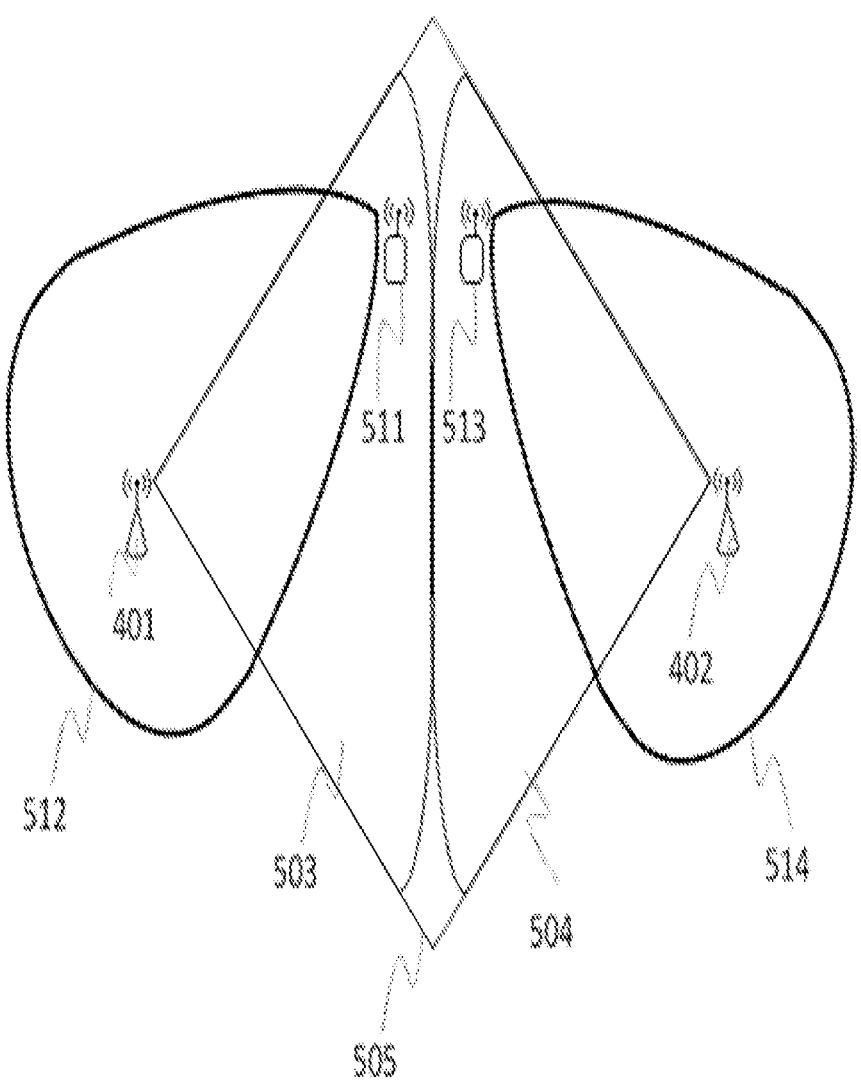
FIG. 8 shows example coverage of a given area for a mobile/nomadic device or station with a smart antenna with the same base stations and the same area of interest as in FIG. 2.

FIG. 8 shows the coverage for the base stations 401 and 402 of FIG. 2 but with the mobile/nomadic devices 511 and 513 using smart antennas. Compared to FIG. 2 the coverage 503 for the base-station 401 and the coverage 504 for the base-station 402 are much larger, almost covering the entire area of interest 405. Mobile device 511 selects beam 512 that provides good signal strength from base station 401 and provides good isolation from (rejection of) base station 402, which means good SINR and therefore signal quality. Similarly mobile device 513 selects beam 514 that includes base station 402 but excludes base station 401.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A smart antenna system for communicating wireless signals between a mobile device and a plurality of fixed base stations using one or more channels and one or more beams, said smart antenna system comprising a control subsystem, a radio transceiver and an antenna subsystem coupled to each other to
perform scanning of one or more combinations of base stations, channels and beams using one or more test links established with one or more of said fixed base stations, said one or more test links using at least some of the channels and the beams;
compute one or more performance measures using the data obtained during the scanning, the one or more performance measures based on at least one of signal to noise ratio (SNR),
signal to interference and noise ratio (SINR),
bit error rate (BER),
packet error rate (PER),
throughput, and
jitter;

select a first combination of base station, channel and beam based on the computed one or more performance measures;

establish a first operating link for transmitting a wireless signal to the currently selected base station using the currently selected channel and beam; and after establishing said first operating link, perform continued scanning using one or more test links established with one of the currently selected base station and channel, and one or more beams different from the currently selected beam, and one or more combinations of base stations, channels and beams, said continued scanning being performed in one of a periodic and aperiodic mode; and wherein before performing said continued scanning, said control subsystem inserts a downtime, and said continued scanning is performed during said downtime.

2. The system of claim 1, wherein if said continued scanning is performed in an aperiodic mode, then the interval between consecutive continued scanning operations is pseudo-random.

3. The system of claim 1, wherein one or more combinations of base stations, channels and beams are used in said continued scanning every downtime.

4. The system of claim 3, wherein said control subsystem calculates the duration of the downtime before inserting said downtime.

5. The system of claim 4, wherein said calculated duration of downtime is less than a threshold duration to obtain sufficient data to determine performance of one combination; and said continued scanning is performed over more than one downtime until sufficient data is obtained.

6. The system of claim 4, wherein a plurality of combinations are used in said continued scanning, and said calculated duration of downtime is less than a threshold duration to obtain sufficient data to determine performance of all combinations within said plurality of combinations; and said continued scanning is performed over more than one downtime until sufficient data is obtained.

7. A method of communicating wireless signals between a mobile device and a plurality of fixed base stations using one or more channels and having one or more beams, said method comprising scanning one or more combinations of base stations, channels and beams using one or more test links established with one or more of said fixed base stations, said one or more test links using at least some of the one or more channels and the one or more beams;

computing one or more performance measures using the data obtained during the scanning, the one or more performance measures based on at least one of signal to noise ratio (SNR), signal to interference and noise ratio (SINR), bit error rate (BER), packet error rate (PER), throughput, and jitter;

selecting a first combination of base station, channel and beam based on the computed one or more performance measures;

establishing a first operating link for transmitting a wireless signal to the selected base station using the selected channel and beam;

after establishing said first operating link, performing continued scanning using one or more test links established with one of the currently selected base station and channel, and using one or more beams different from the currently selected beam, and with one or more combinations of base stations, channels and beams, wherein said continued scanning is performed in one of periodic and aperiodic mode; and wherein prior to performing said continued scanning, inserting a downtime, and said continued scanning is performed during said downtime.

8. The method of claim 7, wherein said continued scanning is performed in an aperiodic mode, and the interval between consecutive continued scanning operations is pseudo-random.

9. The method of claim 7, wherein one or more combinations of base stations, channels and beams are used in said continued scanning every downtime.

10. The method of claim 9, further comprising calculating the duration of the tracking downtime before inserting said downtime.

11. The method of claim 10, wherein said calculated duration of downtime is less than a threshold duration to obtain sufficient data to determine performance of one combination, and said continued scanning is performed over more than one downtime until sufficient data is obtained.

12. The system of claim 10, wherein a plurality of combinations are used in said continued scanning, said calculated duration of downtime is less than a threshold duration to obtain sufficient data to determine performance of all combinations within said plurality of combinations; and said continued scanning is performed over more than one downtime until sufficient data is obtained.

* * * * *

UNITED STATES PATENT AND TRADEMARK OFFICE
CERTIFICATE OF CORRECTION

| | | |
|---|---|---|
| PATENT NO. | : 8,805,363 B2 | Page 1 of 1 |
| APPLICATION NO. | : 13/899787 | |
| DATED | : August 12, 2014 | |
| INVENTOR(S) | : Octavian Sarca et al. | |

It is certified that error appears in the above-identified patent and that said Letters Patent is hereby corrected as shown below:

On the Title Page, Item (54), and in the Specification, Column 1, in the title, please insert
--WITH ENHANCED TRACKING-- after "REJECTION".

Signed and Sealed this
Twenty-fifth Day of November, 2014

Michelle K. Lee
*Deputy Director of the United States Patent and Trademark Office*